United States Patent
Parola et al.

(10) Patent No.: US 12,140,532 B2
(45) Date of Patent: Nov. 12, 2024

(54) SPECTROMETER INCLUDING AN ILLUMINATION CHANNEL THAT INCLUDES A LIGHT PIPE

(71) Applicant: ams Sensors Singapore Pte. Ltd., Singapore (SG)

(72) Inventors: Elisa Parola, Zurich (CH); Bassam Hallal, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 202 days.

(21) Appl. No.: 17/600,191

(22) PCT Filed: Apr. 23, 2020

(86) PCT No.: PCT/SG2020/050250
§ 371 (c)(1),
(2) Date: Sep. 30, 2021

(87) PCT Pub. No.: WO2020/222702
PCT Pub. Date: Nov. 5, 2020

(65) Prior Publication Data
US 2022/0178818 A1     Jun. 9, 2022

Related U.S. Application Data

(60) Provisional application No. 62/840,764, filed on Apr. 30, 2019.

(51) Int. Cl.
*G01N 21/31*     (2006.01)

(52) U.S. Cl.
CPC ....... *G01N 21/31* (2013.01); *G01N 2201/062* (2013.01)

(58) Field of Classification Search
CPC ................................ G01J 3/0208; G01J 3/36
See application file for complete search history.

(56) References Cited

U.S. PATENT DOCUMENTS

| 6,818,892 B1 | 11/2004 | Etienne et al. |
| 7,869,041 B2 | 1/2011 | Tsao |

(Continued)

FOREIGN PATENT DOCUMENTS

| CN | 1372635 A | 10/2002 |
| CN | 1755432 A | 4/2006 |

(Continued)

OTHER PUBLICATIONS

International Search Report with Written Opinion for related Application No. PCT/SG2020/050250 dated Jul. 23, 2020 (13 Pages).

(Continued)

*Primary Examiner* — Hina F Ayub
(74) *Attorney, Agent, or Firm* — Viering, Jentschura & Partner mbB; Samuel Y. Lo

(57) ABSTRACT

An apparatus includes a spectrometer. A housing is attached to a substrate and defines an illumination channel and a receiving channel. The illumination channel includes an illumination source mounted on the substrate and operable to produce light in a particular part of the spectrum. A light pipe is disposed over the illumination source so as to direct light from the illumination source out of the illumination channel toward a target. The receiving channel includes a sensor chip mounted on the substrate. The sensor chip includes light sensitive elements, each of which is selectively sensitive to a respective region of the particular part of the spectrum. The sensor chip further includes an electronic control unit operable to analyze signals from the light sensitive elements.

15 Claims, 4 Drawing Sheets

(56) References Cited

U.S. PATENT DOCUMENTS

| | | |
|---|---|---|
| 9,891,109 B2 | 2/2018 | Sheridan |
| 2002/0196438 A1 | 12/2002 | Kerschbaumer et al. |
| 2003/0169421 A1* | 9/2003 | Ehbets .................... G01J 3/501 |
| | | 356/406 |
| 2006/0102607 A1 | 5/2006 | Adams et al. |
| 2007/0253083 A1 | 11/2007 | Muhlhoff et al. |
| 2009/0279092 A1 | 11/2009 | Tsao |
| 2013/0256534 A1 | 10/2013 | Micheels et al. |
| 2014/0176940 A1* | 6/2014 | Fishbine ................ G01N 21/65 |
| | | 356/318 |
| 2015/0233762 A1 | 8/2015 | Goldring et al. |
| 2016/0187201 A1 | 6/2016 | Wang et al. |
| 2016/0299061 A1 | 10/2016 | Goldring et al. |
| 2017/0027447 A1 | 2/2017 | Sutin et al. |
| 2017/0184452 A1 | 6/2017 | Baron et al. |
| 2017/0205338 A1 | 7/2017 | Coates |
| 2018/0143076 A1 | 5/2018 | Sheridan et al. |
| 2018/0172510 A1* | 6/2018 | Rosen ................... G01J 3/0205 |
| 2019/0310193 A1* | 10/2019 | Scardina ............... G01J 3/0208 |
| 2020/0182695 A1 | 6/2020 | Roentgen et al. |

FOREIGN PATENT DOCUMENTS

| | | |
|---|---|---|
| CN | 1882296 A | 12/2006 |
| CN | 101065649 A | 10/2007 |
| CN | 105593651 A | 5/2016 |
| CN | 106461461 A | 2/2017 |
| CN | 106908146 A | 6/2017 |
| CN | 107110769 A | 8/2017 |
| CN | 107870386 A | 4/2018 |
| CN | 111033194 A | 4/2020 |
| EP | 3057139 A2 | 8/2016 |
| JP | 2014016176 A | 1/2014 |
| JP | 2018163568 A | 10/2018 |
| WO | 2018015951 A1 | 1/2018 |

OTHER PUBLICATIONS

First Search issued for the parallel Chinese patent application No. 2020800324502, dated Jan. 31, 2024, 3 pages (for informational purposes only).

Office Action issued for the parallel German patent application No. 11 2020 002 183.1, dated Oct. 26, 2023, 11 pages (for informational purposes only).

* cited by examiner

SPECTROMETER INCLUDING AN ILLUMINATION CHANNEL THAT INCLUDES A LIGHT PIPE

FIELD OF THE DISCLOSURE

The present disclosure relates to spectrometers.

BACKGROUND

A spectrometer is an instrument used to measure a light spectrum of sample light (e.g., to determine the spectral components of ultraviolet, visible, and/or infrared light). In some cases, spectrometers can determine the intensity of light as a function of wavelength or of frequency.

Spectrometers can be used for a variety of different applications. For example, spectrometers can be used to conduct environmental analyses, industrial monitoring, color measurements, and pharmacological studies.

In some applications, an illumination source produces light that is emitted toward a target, and the spectrometer measures the emission spectrum of the target in order to identify, for example, the target's chemical composition.

SUMMARY

The present disclosure describes spectrometer that integrate the illumination channel and receiving channel into a single package, and that include a light pipe in the illumination channel.

For example, in one aspect, the disclosure describes an apparatus that includes a spectrometer. The spectrometer includes a substrate. A housing is attached to the substrate and defines an illumination channel and a receiving channel. The illumination channel includes an illumination source mounted on the substrate and operable to produce light in a particular part of the spectrum. A light pipe is disposed over the illumination source so as to direct light from the illumination source out of the illumination channel toward a target. The receiving channel includes a sensor chip mounted on the substrate. The sensor chip includes light sensitive elements, each of which is selectively sensitive to a respective region of the particular part of the spectrum. The sensor chip further includes an electronic control unit operable to analyze signals from the light sensitive elements.

Some implementations include one or more of the following features. For example, the light pipe can be arranged so that at least some of the light produced by the illumination source is directed out of the illumination channel by internal reflection from a lateral side of the light pipe. The light pipe may be attached to, and suspended from, a cover glass that is disposed over the illumination channel. In some cases, the light pipe is a single unitary piece with a cover glass that is disposed over the illumination channel. In some instances, the light pipe is supported above the illumination source by one or more stand-offs. A cladding layer may be present on a lateral side surface of the light pipe. A material for the cladding layer can be selected so as to achieve total internal reflection for light produced by the illumination source that is incident on the lateral side surface of the light pipe. In some implementations, the light pipe is attached by adhesive to an inner wall of the housing. In some cases, regions between lateral sides of the light pipe and inner walls of the of the housing are filled with a material that has a refractive index such that at least some light produced by the illumination source that is incident on the lateral sides of the light pipe is reflected by total internal reflection. In some instances, the light pipe comprises a hollow metal light pipe operable to reflect the light from the illumination source by specular reflection.

The illumination source can include multiple light emitters operable to produce light in respective wavelength ranges that differ from one another. Further, the light pipe can have a profile or cross-section that increases color mixing of light from the light emitters. In some implementations, the light pipe has a shape that increases color mixing of light from the light emitters. The light pipe may have corrugations on its exterior vertical surface. In some instances, alignment of the light pipe is offset from the light emitters in a direction away from the receiving channel.

One or more of the following advantages are present in some implementations. For example, the light pipe can help reduce or prevent optical losses that otherwise might occur inside the illumination channel and can help boost the optical power emission from the module.

Other aspects, features and advantages will be readily apparent from the following detailed description, the accompanying drawings, and the claims.

DETAILED DESCRIPTION

Figure 1:
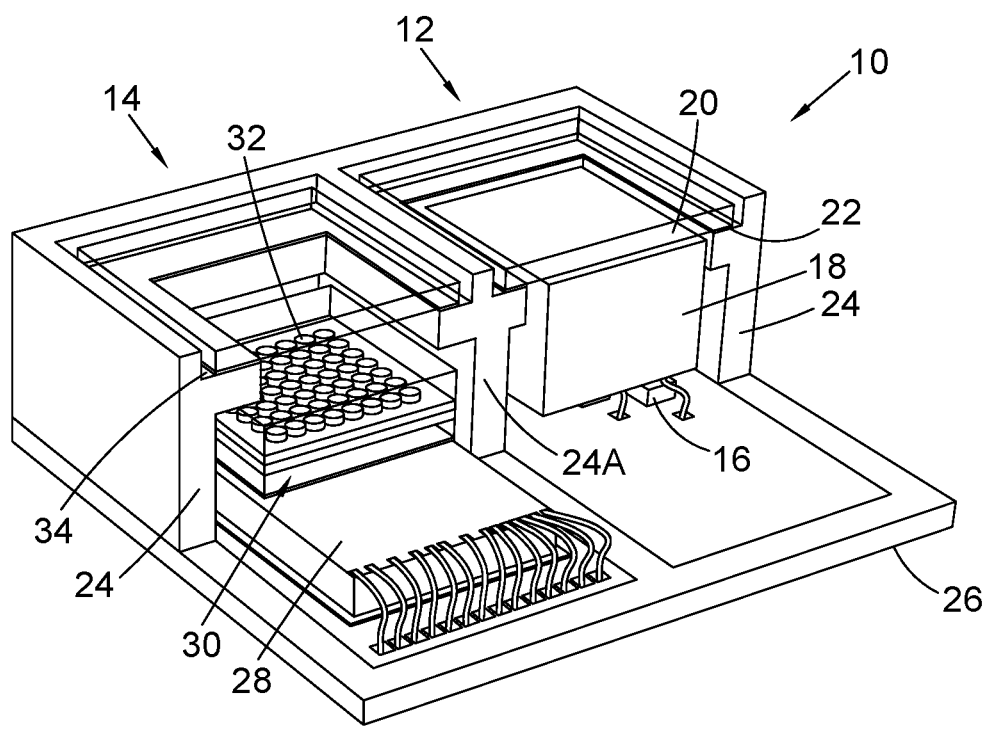
FIG. 1 illustrates a cut-away view of an example of a spectrometer package.

The present disclosure describes a compact spectrometer that integrates both the illumination source and sensor into a single package. As shown in FIG. 1, the spectrometer 10 includes an illumination channel 12 and a receiving channel 14. The illumination channel 12 includes an illumination source that can be implemented, for example, as one or more light emitting diodes (LEDs) 16 mounted to a substrate such as a printed circuit board (PCB) 26. In some implementations, each LED 16 is dedicated to producing illumination within a different respective portion of the near infra-red part of the electromagnetic spectrum (e.g., 750-1050 nm). The number of LEDs 16 and their respective wavelength ranges may differ depending on the particular application.

Figure 3A:
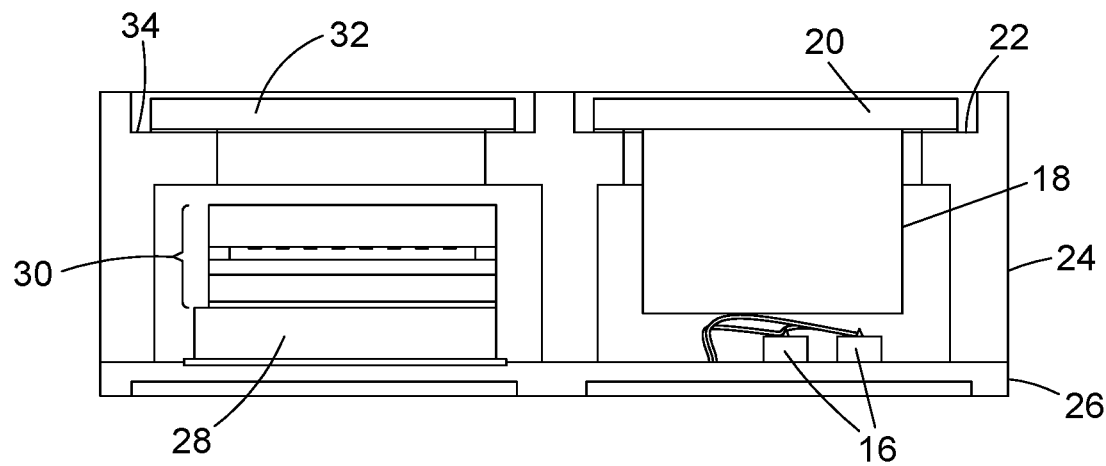
FIGS. 3A and 3B illustrate cross-sectional views of the spectrometer package.

A light pipe 18, which is disposed within the illumination channel 12 over the LEDs 16, is operable to direct light from the LEDs 16 out of the package. In some instances, as illustrated in FIG. 3A, the light pipe 18 is attached (e.g., by adhesive 19) to the underside of a protective cover glass 20 disposed over the illumination channel 12. The cover glass 20 can be attached (e.g., by adhesive 21) to a ledge 22 of the housing 24 for the package. The housing 24, in turn, can be attached to the PCB 26 by adhesive 25.

The light pipe 18 can be implanted as a solid block composed, for example, of glass or plastic. The refractive index of the adhesive 19 preferably is very close to that of the light pipe 18. Likewise, the refractive index of the cover glass 20 preferably is very close to that of the light pipe 18. The presence of the light pipe 18 can provide various advantages in some implementations. For example, the light pipe 18 can help reduce or prevent optical losses that otherwise might occur inside the illumination channel 12. The light pipe 18 can, therefore, help boost the optical power emission from the spectrometer 10. In some cases, the light pipe 18 also can redirect the light towards the receiving channel 14, as indicated by the arrow 41 in FIG. 3B. Likewise, the presence of the light pipe 18 can, in some instances, reduce the impact that placement tolerances of the LEDs 16 have on performance. For implementations in which there are multiple LEDs 16 emitting in different wavelength ranges, the light pipe 18 may increase the light mixing that occurs as light is reflected (e.g., by total internal reflection) at the boundary of the light pipe.

Figure 3B:
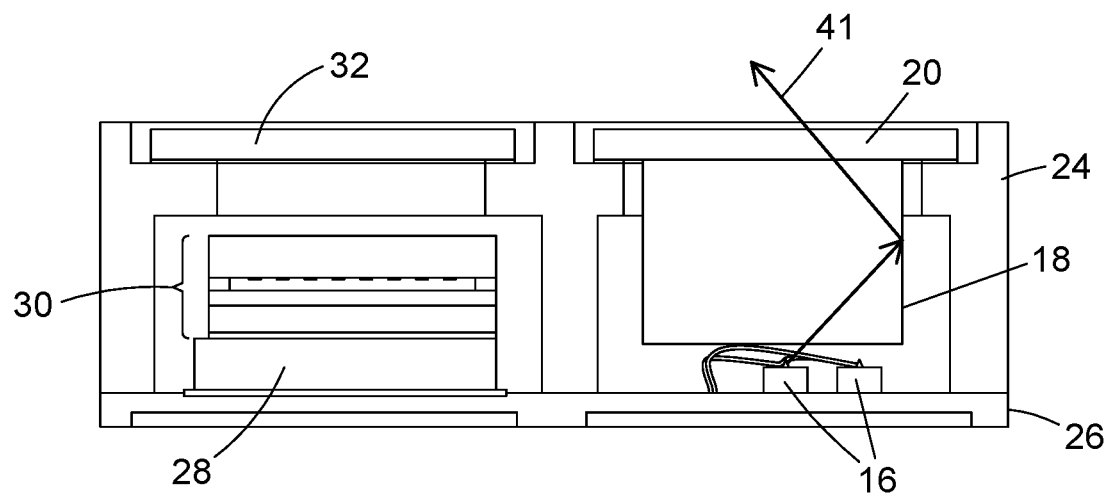
Figure 4:
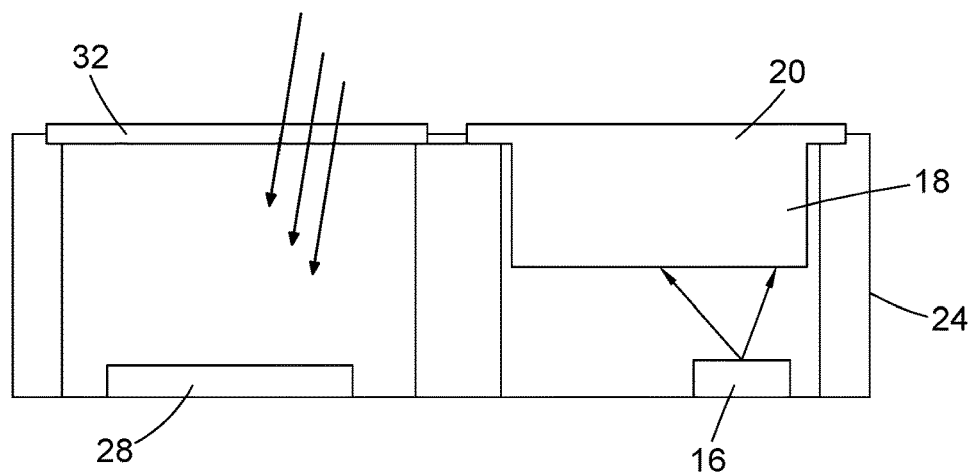
FIG. 4 illustrates a cross-sectional view of another implementation of the spectrometer package.

As illustrated in FIGS. 3A-3B, the light pipe 18 can be attached to, and suspended from, the cover glass 20. This implementation can be advantageous because it avoids the need to provide adhesive along the lateral sides of the light pipe 18 for attachment to the internal sidewalls of the housing 24. In some implementations, as illustrated in FIG. 4, the light pipe 18 can be formed as a single unitary piece with the cover glass 20. In such cases, the adhesive 19 for attaching the light pipe 18 to the cover glass 20 can be omitted. In some implementations, the light pipe 18 is supported above the LEDs 16 by stand-offs.

Figure 5:
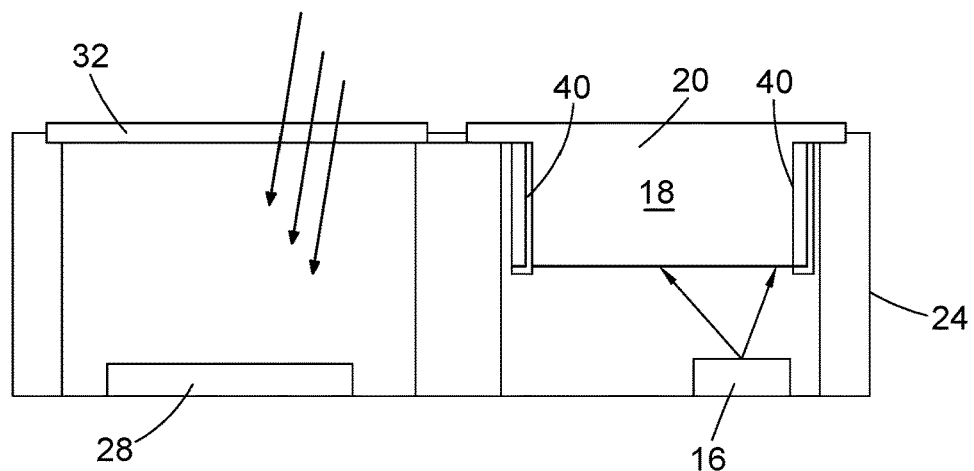
FIG. 5 illustrates a cross-sectional view of yet another implementation of the spectrometer package.

Further, in some cases, as shown in FIG. 5, a cladding layer 40 can be provided on one or more lateral side surfaces of the light pipe 18. The material for the cladding layer 40 should be selected so as to achieve substantially total internal reflection for LED light that is incident on the inner side surface of the light pipe 18. If a cladding is present, then the light pipe 18 may be attached by adhesive to the inner walls of the housing 24 and still be operable to reflect light from the LEDs 16 out of the spectrometer 10.

Figure 6:
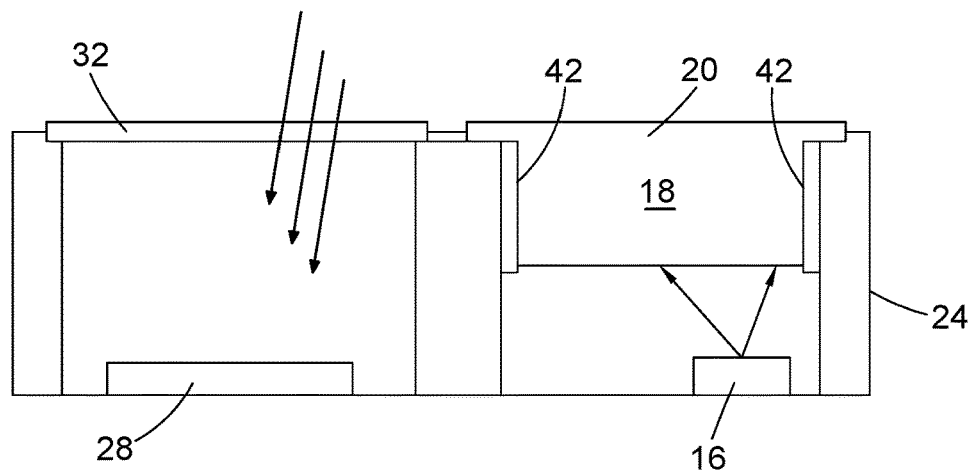
FIG. 6 illustrates a cross-sectional view of a further implementation of the spectrometer package.

In some instances, as shown in FIG. 6, the air gaps between the lateral sides of the light pipe 18 and the inner walls of the of the housing 24 can be filled with a material 42 that has a refractive index such that LED light that is incident on the inner side surface of the light pipe 18 is reflected (e.g., by total internal reflection).

In some instances, the light pipe profile can be optimized to improve color mixing. Likewise, in some cases, the cross-section of the light pipe 18 can be configured to optimize color mixing. For example, in some implementations, the light pipe 18 has a square or hexagonal cross-section. The light pipe 18 also can include other features for improving color mixing. These features may include, for example, corrugations on the exterior vertical surface of the light pipe 18. Further, in some cases, the alignment of the light pipe 18 is offset with respect to the light emitter(s) 16. In particular, in some instances, it can be beneficial to offset the light pipe 18 from the light emitters 16 in a direction away from the receiving channel 14.

In some instances, the light pipe 18 can be implemented, for example, as a hollow (e.g., cylindrical, parallel-piped or hexagonal) metal light pipe instead of a solid glass or plastic light pipe that is operable to reflect the light from the illumination source 16 by specular reflection.

Figure 2:
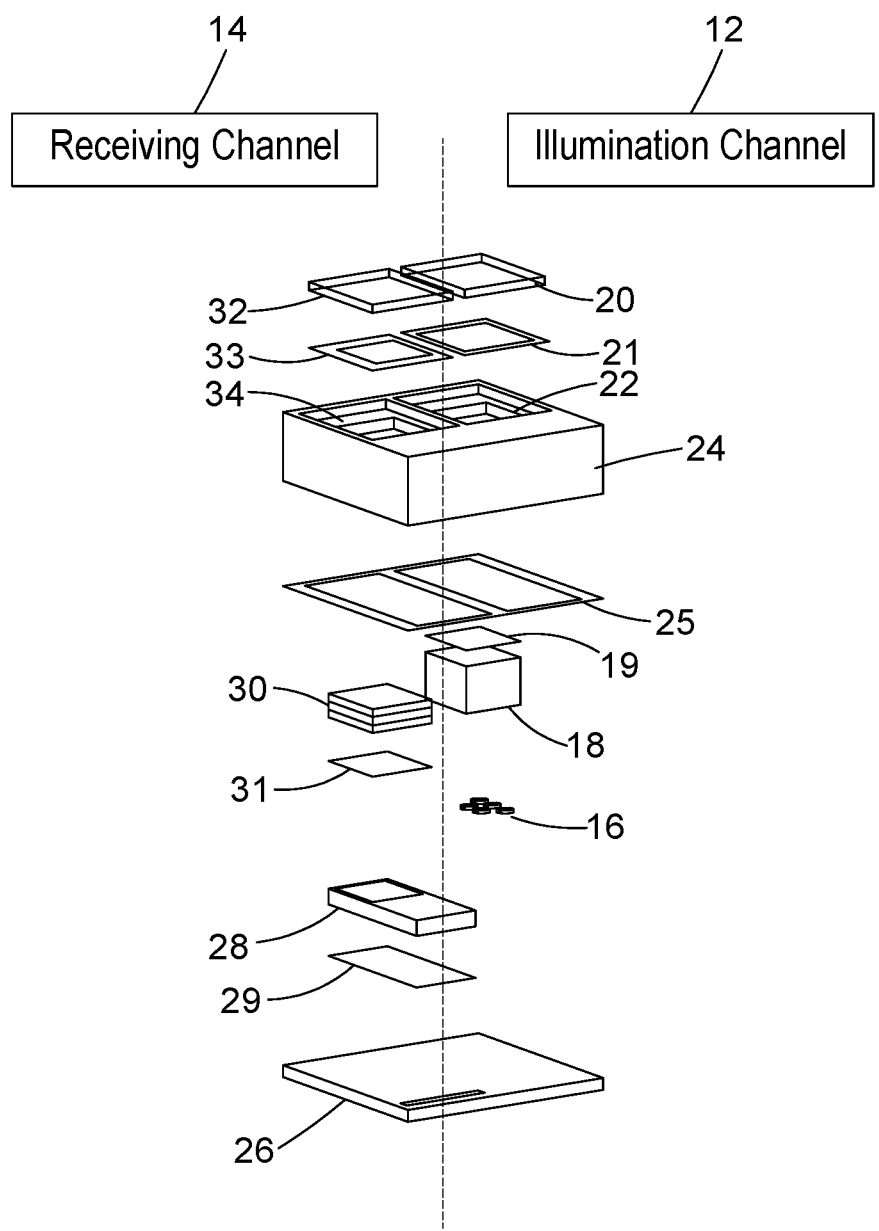
FIG. 2 illustrates an exploded view of the spectrometer package of FIG. 1.

As further shown in FIGS. 1 and 2, the receiving channel 14 of the spectrometer 10 includes a silicon sensor chip 28 mounted (e.g., via a die pad 29) to the PCB 26. The sensor chip 28 can include, for example, a single detector with n channels or a camera chip as an array of n channels. In some implementations, the sensor chip 28 has an array of light sensitive elements (e.g., pixels), each of which is selectively sensitive to a respective narrow region of the relevant spectrum. Assuming, for example, that the LEDs 16 collectively emit light in the range of 750-1050 nm, each pixel in the sensor 28 can have an optical filter over the pixel, where the filter is operable to pass a respective narrow region of the spectrum for that pixel selectively such that the pixels collectively are operable to sense light in the range of 750-1050 nm.

In some cases, the optical filters for the channels are implemented as absorption filters or interference filters. In some implementations, the filters define a symmetric function (e.g., Gaussian, cosine, trapezoid, triangle) for the spectral sensitivity of each channel. In a particular example, the sensor chip 28 includes an 8×8 array of pixels, each of which has an associated interference filter that defines a full-width half-maximum (FWHM) of about 5 nm. Each pixel can be centered about a respective wavelength, such that collectively the pixels can sense light over the desired range (e.g., 750-1050 nm). The optical filters can be implemented, for example, as interference filters that employ constructive and destructive interference principles in order to transmit the desired wavelengths and reflect the other wavelengths. In some implementations, optical elements (e.g., lenses or masks) 30 are provided in the path of incoming light to limit the pixel's field of view.

A protective cover glass 32 can be disposed over the receiver channel 14. For example, the cover glass 32 can be attached (e.g., by adhesive 33) to a second ledge 34 of the housing 24. Further, a portion 24A of the housing 24 can serve as an internal wall that optically isolates the receiver channel 14 from the illumination channel 12.

In some applications, the illumination source 16 produces light that is emitted toward a target, and the sensor chip 28 measures the emission spectrum of the target in order to identify, for example, the target's chemical composition. The range of 750-1050 nm can be useful, for example, to detect the melanin content of human skin. Different wavelength ranges may be appropriate for other applications.

The sensor chip 28 can include an electronic control unit (ECU) operable to receive and process output signals from the pixels. In some instances, the ECU includes an analog-to-digital converter (ADC) to measure the photocurrent generated by each pixel. The output responses then are processed for signal treatment and data analysis (e.g., to identify the target or its composition) based on an analysis of the output signals from the pixels. For example, in some implementations, the ECU is operable to identify a composition of the target based on the pixel output signals. Identifying the composition may include, for example, determining whether an overall responsivity of the pixels matches a particular spectral signature stored in memory.

Various aspects of the subject matter and the functional operations described in this specification can be implemented in digital electronic circuitry, or in computer software, firmware, or hardware, including the structures disclosed in this specification and their structural equivalents, or in combinations of one or more of them. Aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The processes and logic flows also can be performed by, and apparatus also can be implemented as, special purpose logic circuitry, e.g., an FPGA (field programmable gate array) or an ASIC (application specific integrated circuit).

The spectrometer 10 can be integrated, for example, into a portable computing device such as a smartphone, a tablet, a personal data assistant (PDA), laptop computer, notebook computer, or a wearable device, as well as other such devices.

Portable computing devices referenced in this disclosure may include, for example, one or more processors, one or more memories (e.g. RANI), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

Various modifications can be made within the spirit of the present disclosure. Thus, other implementations are within the scope of the claims.

The invention claimed is:

1. An apparatus comprising:
   a spectrometer including:
      a substrate; and
      a housing attached to the substrate and defining an illumination channel and a receiving channel,
   wherein the illumination channel includes:
      an illumination source mounted on the substrate and operable to produce light in a particular part of the spectrum; and
      a light pipe disposed over the illumination source so as to direct light from the illumination source out of the illumination channel toward a target, wherein the light pipe is comprised of a solid block of transparent material;
   wherein the apparatus further comprises a cover glass disposed over the illumination channel, wherein the light pipe is suspended from the cover glass; and
   wherein the receiving channel includes:
      a sensor chip mounted on the substrate and including a plurality of light sensitive elements, each of which is selectively sensitive to a respective region of the particular part of the spectrum, the sensor chip further including an electronic control unit operable to analyze signals from the light sensitive elements.

2. The apparatus of claim 1 wherein the light pipe is arranged so that at least some of the light produced by the illumination source is directed out of the illumination channel by internal reflection from a lateral side of the light pipe.

3. The apparatus of claim 1 wherein the light pipe is supported above the illumination source by one or more stand-offs.

4. The apparatus of preceding claim 1 wherein a cladding layer is present on a lateral side surface of the light pipe.

5. The apparatus of claim 4 wherein a material for the cladding layer achieves total internal reflection for light produced by the illumination source that is incident on the lateral side surface of the light pipe.

6. The apparatus of claim 1 wherein regions between lateral sides of the light pipe and inner walls of the of the housing are filled with a material that has a refractive index such that at least some light produced by the illumination source that is incident on the lateral sides of the light pipe is reflected by total internal reflection.

7. The apparatus of claim 1 wherein the illumination source includes a plurality of light emitters operable to produce light in respective wavelength ranges that differ from one another.

8. The apparatus of claim 7 wherein the light pipe has a profile or cross-section that increases color mixing of light from the light emitters.

9. The apparatus of claim 7 wherein the light pipe has a shape that increases color mixing of light from the light emitters.

10. The apparatus of claim 7 wherein alignment of the light pipe is offset from the light emitters in a direction away from the receiving channel.

11. The apparatus of claim 1 wherein the light pipe has corrugations on an exterior vertical surface of the light pipe.

12. The apparatus of claim 1 wherein the cover glass is attached to a ledge of the housing and wherein the light pipe is attached to a side of the cover glass facing the substrate.

13. The apparatus of claim 12 further comprising air gaps between lateral sides of the light pipe and inner walls of the housing.

14. The apparatus of claim 13 wherein the air gaps are filled with a material that has a refractive index such that at least some light produced by the illumination source that is incident on the lateral sides of the light pipe is reflected by total internal reflection.

15. The apparatus of claim 13 wherein a refractive index of the cover glass and a refractive index of the light pipe are the same or very similar.

* * * * *